United States Patent [19]

Hornstra

[11] Patent Number: 5,003,177

[45] Date of Patent: Mar. 26, 1991

[54] COAXIAL CABLE WITH SCREENING ELECTRODE FOR USE AS AN IONIZATION CHAMBER

[75] Inventor: Fred Hornstra, Springfield, S. Dak.

[73] Assignee: Deutsches Elektronen-Synchrotron DESY, Hamburg, Fed. Rep. of Germany

[21] Appl. No.: 406,346

[22] Filed: Sep. 13, 1989

Related U.S. Application Data

[63] Continuation of PCT/EP88/00227, filed Mar. 21, 1988, published as WO88/07756 on Oct. 6, 1988.

[30] Foreign Application Priority Data

Mar. 26, 1987 [DE] Fed. Rep. of Germany ....... 3710012

[51] Int. Cl.[5] ................................................ G01J 5/38

[52] U.S. Cl. .................................. 250/374; 250/385.1

[58] Field of Search .............................. 250/374, 385.1

[56] References Cited

U.S. PATENT DOCUMENTS

| | | | |
|---|---|---|---|
| 3,884,817 | 5/1975 | Jilbert | 250/385.1 |
| 4,379,248 | 4/1983 | Wakayama et al. | 250/385.1 X |
| 4,682,036 | 7/1987 | Wakayama et al. | 250/374 |
| 4,751,391 | 6/1988 | Eberhard et al. | 250/385.1 |
| 4,859,855 | 8/1989 | Vlasbloem | 250/385.1 |
| 4,896,041 | 1/1990 | Vlasbloem et al. | 250/385.1 |

OTHER PUBLICATIONS

"The System for Precise Measurement of Accelerator Extraction Efficiency," Hornstra, Nuclear Instruments and Methods, 128 (1975) pp. 435,440.

*Primary Examiner*—Constantine Hannaher
*Assistant Examiner*—Jacob Eisenberg
*Attorney, Agent, or Firm*—Nixon & Vanderhye

[57] ABSTRACT

The invention relates to a coaxial cable for use as an ionization chamber with an inner signal electrode (1) and an outer high-voltage electrode (2), surrounding the latter, which are held at a distance from each other by an insulator (3). The insulator (3) contains as an integral part a secreening electrode (4) which prevents leakage currents from flowing from the high-voltage electrode (2) to the signal electrode (1).

9 Claims, 5 Drawing Sheets

Figure 3:
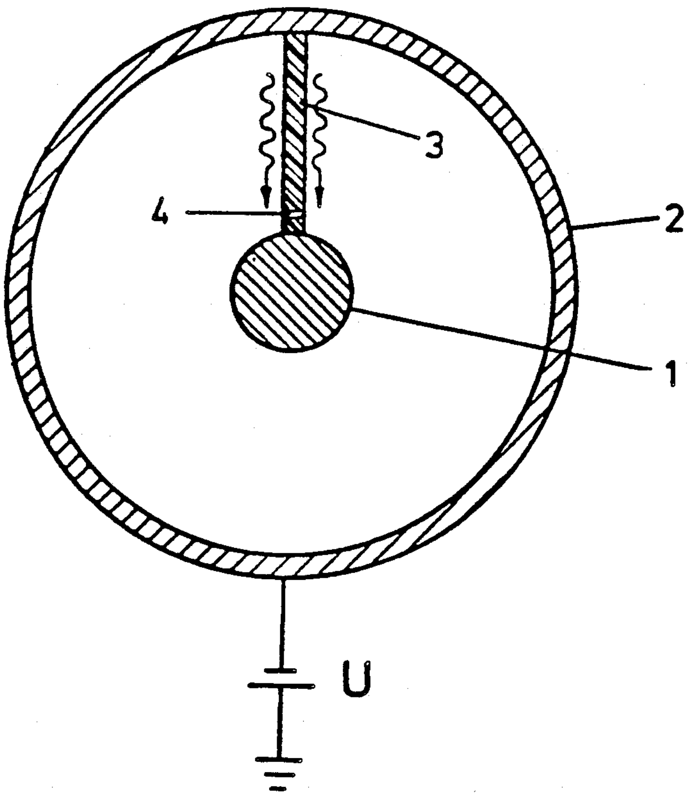

FIG. 1
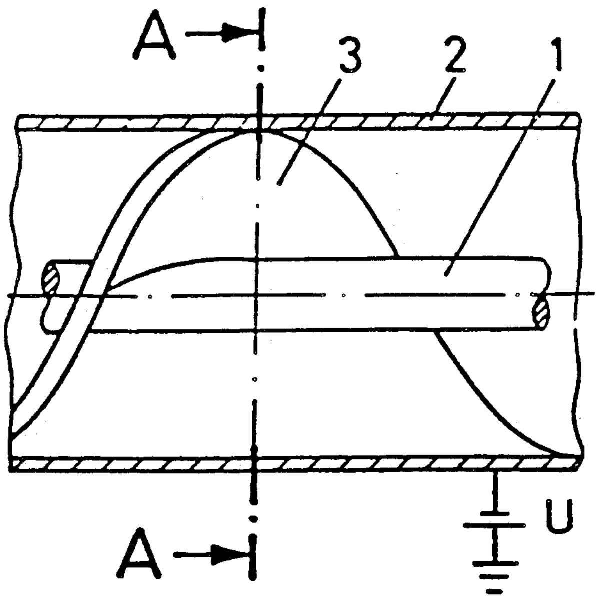
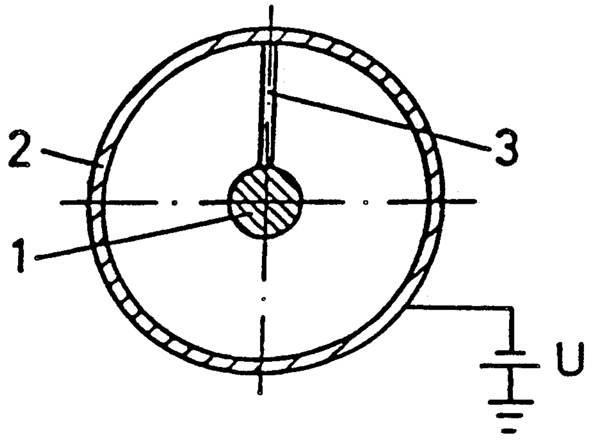
FIG. 2

FIG. 4
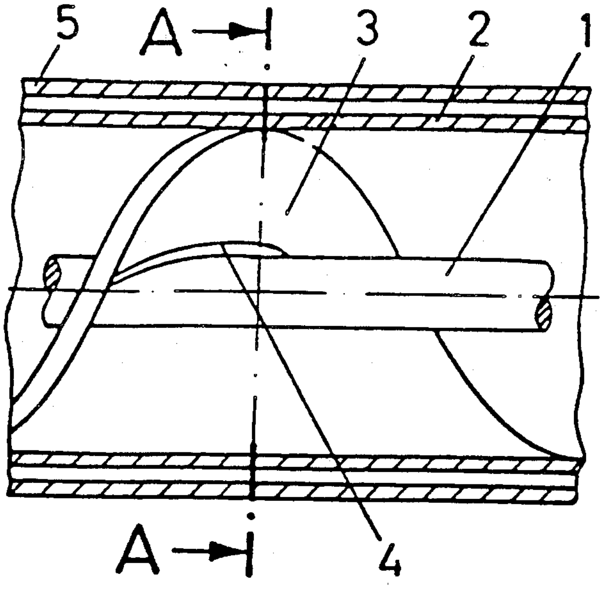
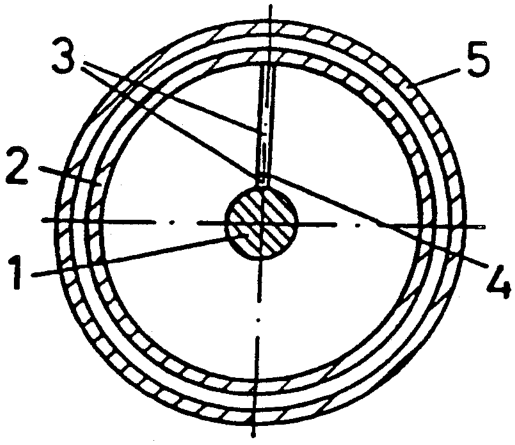
FIG. 5

FIG. 6
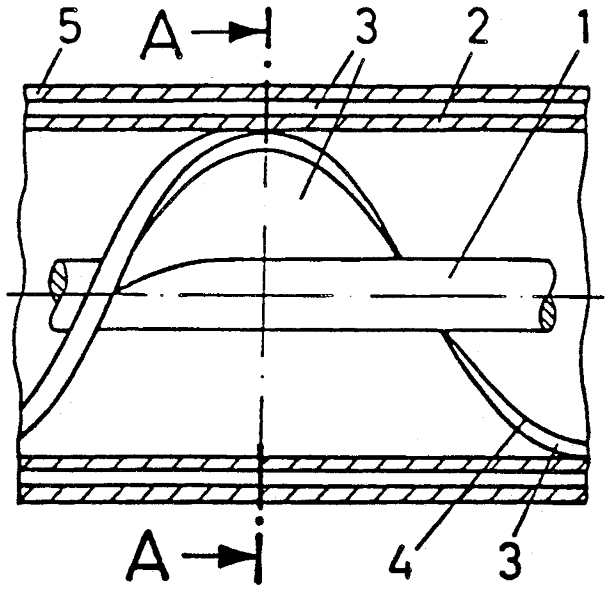
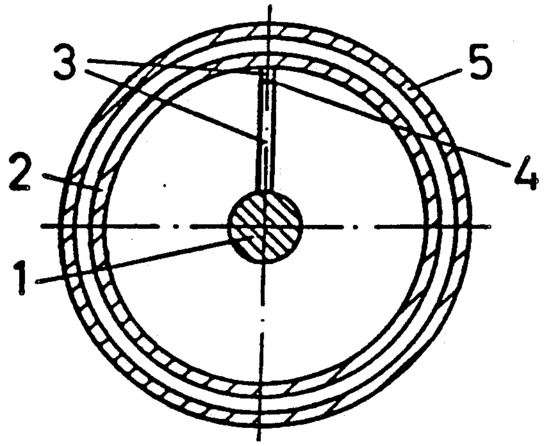
FIG. 7

FIG. 8
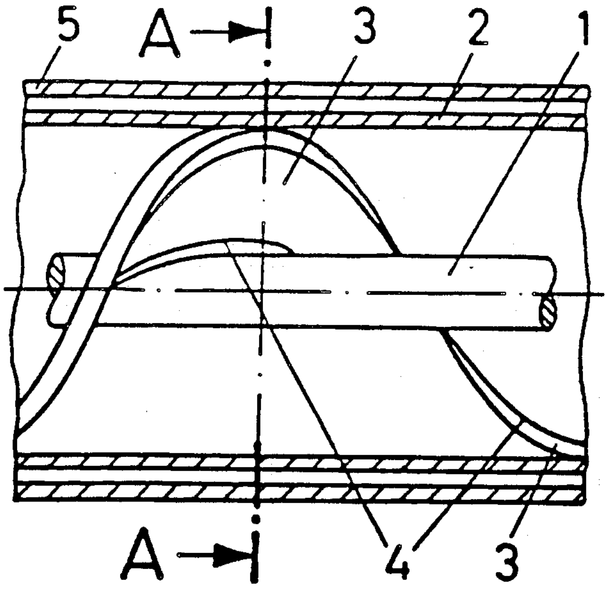
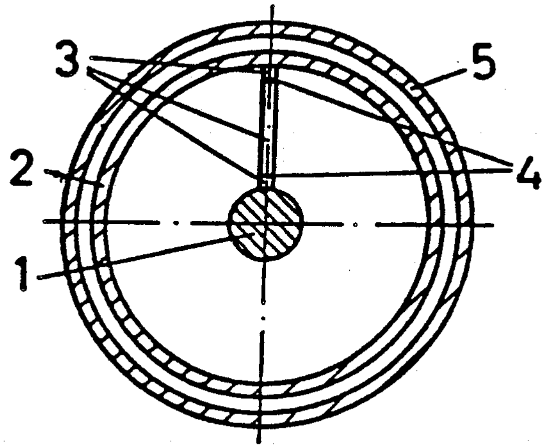
FIG. 9

COAXIAL CABLE WITH SCREENING ELECTRODE FOR USE AS AN IONIZATION CHAMBER

This application is a continuing application under 35 USC 363 of International Application No. PCT/EP88/00227, filed on Mar. 1988.

The invention relates to a coaxial cable for use as an ionisation chamber with a signal electrode, a high-voltage electrode, surrounding the signal electrode concentrically, and an insulator which holds the high-voltage electrode at a distance from the signal electrode.

The improvisation of ionisation chambers in a simple way from coaxial cable, in which a signal electrode in the form of a copper wire or a copper rod is surrounded concentrically by a high-voltage electrode, is already known (see F. Hornstra in Nuclear Instruments and Methods, 128, pages 435 to 440, 1975). The distance between the central signal electrode and the outer high-voltage electrode concentric with it is held constant by an insulator, which consists, for example, of a helix of a synthetic material such as polyethylene or polypropylene. The dielectric between the signal electrode and the high-voltage electrode is usually air, but a test gas such as argon or a neon-helium mixture can also be used instead of air. In use the high-voltage electrode is connected to a voltage of several hundred volts, through which ions which form in the annular space formed between the signal electrode and the high-voltage electrode, are accelerated in the direction of the signal electrode and produce a signal current there.

A disadvantage of these ionisation chambers is that a leakage current constantly flows from the high-voltage electrode to the signal electrode both through the insulator as volume current and also along its surface. These leakage currents increase with the length of the cable and as the high voltage increases and they distort the signal current. This can ultimately result in the leakage currents reaching the magnitude of the signal currents so that measurement with the ionisation chamber becomes more and more erroneous and in some circumstances even becomes inadmissible.

It is the object of the invention to improve the coaxial cable of the type mentioned in the introduction in such a way that no leakage currents flow from the high-voltage electrode to the signal electrode.

To achieve this aim the coaxial cable is distinguished by the fact that the insulator has a screening electrode which extends along the entire length of the coaxial cable over its entire cross section. The screening electrode is connected to earth when in operation and thus conducts away leakage currents both from the surface and from the inside of the insulator before they reach the signal electrode. As a result the ionisation chamber can be used for smaller signal currents but also with greater lengths and higher voltages.

Advantageous embodiments of the invention result from the dependent claims.

The invention is explained in more detail in the following by means of figures. These show:

FIG. 1 a longitudinal section through part of a coaxial cable;

FIG. 2 a section taken along the line A—A of FIG. 1;

FIG. 3 an enlarged section of the view in FIG. 2;

FIG. 4 a longitudinal section through part of a coaxial cable with an inner screening electrode;

FIG. 5 a section taken along the line A—A of FIG. 4;

FIG. 6 a longitudinal section through part of a coaxial cable with an outer screening electrode;

FIG. 7 a section taken along the line A—A of FIG. 6;

FIG. 8 a longitudinal section through part of a coaxial cable with an inner and an outer screening electrode; and FIG. 9 a section taken along the line A—A of FIG. 8.

FIG. 1 shows a longitudinal section through part of a coaxial cable with an inner signal electrode 1 which is concentrically surrounded by an outer high-voltage electrode 2. The distance between the signal electrode 1 and the high-voltage electrode 2 is established by a spiral-shaped insulator 3 which surrounds the signal electrode 1 in helical form over the entire length of the coaxial cable. In an embodiment the insulator has a uniform cross-section. Its height corresponds to the radial distance from the signal electrode 1 to the high-voltage electrode 2.

In FIG. 2 the width of the insulator 3 is a fraction of its height, its dimensions can be freely selected by an expert and are dictated exclusively by strength and stability requirements. The aim here is to fill as little as possible of the space between the signal electrode 1 and the high-voltage electrode 2 with the insulator 3 because this proportion is lost as ionisation space.

The inner signal electrode 1 is, for example, a copper wire or a copper rod, although of course any other conductive material is possible. The surrounding high-voltage electrode 2 is usually a pipe which when of a larger diameter can also for reasons of strength be a corrugated pipe. The outer diameters of such coaxial cables are usually between 20 and 200 mm. It is clear however that special designs can depart from these ranges.

In the figures the inner electrode is marked as the signal electrode 1 and the outer electrode as the high-voltage electrode 2. It is however clear to an expert that the reverse is also possible, namely that the inner electrode can be connected as the high-voltage electrode and the outer electrode as the signal electrode.

It should also be mentioned that any insulating material, preferably ceramic or synthetic material and in particular synthetic material which is resistant to radiation, can be used as the material for the insulator 3. Possible examples are polyethylene, polypropylene and, particularly preferred, polyamide.

FIG. 3 shows an enlarged representation of the sectional view of FIG. 2, with the surface leakage-currents on the insulator 3 represented by wavy lines. It is clear in this representation that a screening electrode 4, which extends over the entire cross-section of the insulator 3 and which lies near the signal electrode 1, is embedded in the insulator 3. The high voltage applied to the high-voltage electrode 2 is usually in the range of 200 to 1500 volts.

FIG. 4 shows another embodiment of the invention in which the high-voltage electrode 2 is additionally surrounded by a protective conductor 5. This protective conductor 5 is intended to protect the high-voltage electrode 2, usually covered externally by an insulating casing, from any contact in case this leads to damage to the insulating casing, not shown. In addition, this figure shows how the screening electrode 4 together with the insulator 3 winds helically around the signal electrode 1.

FIG. 5 shows a section along the line A—A of FIG. 4, in which one can in addition clearly see the position of the screening electrode 4 near the signal electrode 1, and the distancing of the high-voltage electrode 2 from the protective conductor 5. The protective conductor 5 surrounds the high-voltage electrode 2 concentrically and is likewise held at a distance from the latter by an insulator. This insulator consists, for example, of the same material as the spiral-shaped insulator 3.

FIG. 6 shows an embodiment modified in comparison to FIG. 4, in which the screening electrode 4 is not arranged near the signal electrode 1 but near the high-voltage electrode 2. In this embodiment it is however useful to apply the high voltage to the central electrode 1 and the virtual earth of the ionisation chamber to the outer electrode 2. In this way the signal electrode 1 becomes the high-voltage electrode and the high-voltage electrode 2 becomes the signal electrode.

FIGS. 8 and 9 show a further embodiment in which two screening electrodes 4 are provided in the spiral-shaped insulator 3, one near the central signal electrode 1 and the other near the surrounding high-voltage electrode 2. It is clear that the voltage relationships can also be reversed in this embodiment, i.e. the signal electrode 1 can become the high-voltage electrode and the high-voltage electrode 2 can become the signal electrode.

I claim:

1. Coaxial cable for use as an ionisation chamber with a signal electrode, a high-voltage electrode, which concentrically surrounds the signal electrode, and an insulator which holds the high-voltage electrode at a distance from the signal electrode such that between the signal electrode and the high-voltage electrode there is a continuous hollow space through which a test gas can flow, characterized in that the insulator has a screening electrode which extends along the entire length of the coaxial cable and divides the insulator radially into two electrically separate parts.

2. Coaxial cable according to claim 1, characterized in that the screening electrode is part of the insulator and extends over the entire cross-section of the insulator.

3. Coaxial cable according to claim 1 or 2, characterized in that the insulator is of uniform thickness over the entire length of the coaxial cable and consists of a spiral of synthetic material with an embedded screening electrode.

4. Coaxial cable according to claim 1 or 2, characterized in that the screening electrode is arranged near the signal electrode.

5. Coaxial cable according to claim 1 or 2, characterized in that the screening electrode is arranged near the high-voltage electrode.

6. Coaxial cable according to claim 1 or 2, characterized in that the screening electrode is arranged both near the signal electrode.

7. Coaxial cable according to claim 1 or 2, characterized in that the high-voltage electrode is surrounded by a protective conductor.

8. Coaxial cable according to claim 1 or 2, characterized in that both its ends are closed in such a way that a test gas other than air, which acts as a dielectric and as the gas to be ionised, can be made to flow through the pipe.

9. Coaxial cable according to claim 1 or 2, characterized in that the cable closure at one end allows the admission of test gas and at the other end allows the test gas to be led away.

* * * * *